(12) United States Patent
Chandrasekhar et al.

(10) Patent No.: US 7,308,169 B2
(45) Date of Patent: Dec. 11, 2007

(54) OPTICAL EQUALIZER FOR INTERSYMBOL INTERFERENCE MITIGATION

(75) Inventors: Sethumadhavan Chandrasekhar, Matawan, NJ (US); Andrew R. Chraplyvy, Matawan, NJ (US); Christopher Richard Doerr, Middletown, NJ (US); Peter J. Winzer, Tinton Falls, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 532 days.

(21) Appl. No.: 10/922,690

(22) Filed: Aug. 19, 2004

(65) Prior Publication Data

US 2005/0058459 A1  Mar. 17, 2005

Related U.S. Application Data

(63) Continuation-in-part of application No. 10/735,176, filed on Dec. 12, 2003, now Pat. No. 6,804,434, and a continuation-in-part of application No. 10/393,483, filed on Mar. 20, 2003, now Pat. No. 6,785,446.

(51) Int. Cl.
*G02B 6/26* (2006.01)

(52) U.S. Cl. .......................................... 385/27; 385/15

(58) Field of Classification Search ................. 385/15, 385/27
See application file for complete search history.

(56) References Cited

U.S. PATENT DOCUMENTS 6,400,870 B1 *  6/2002  Hill et al. ..................... 385/39
6,785,446 B1 *  8/2004  Chandrasekhar et al. ..... 385/39
6,804,434 B1 * 10/2004  Chandrasekhar et al. ..... 385/27

OTHER PUBLICATIONS

T. Chiba et al, entitled "Chromatic dispersion free Fourier transform-based wavelength splitters for D-WDM," published in the Fifth Optoelectronics and Communications Conference(OECC 2000), Technical Digest, Jul. 2000.

* cited by examiner

*Primary Examiner*—Jennifer Doan

(57) ABSTRACT

A multi-channel optical equalizer for intersymbol interference mitigation compensates for single- or multi-wavelength channels simultaneously and requires few adjustable parameters. The optical equalizer also compensates for overshoots and signal transition degradations in semiconductor optical amplifiers. The equalizer unit uses one control signal for magnitude and one to control signal phase. The equalizer includes a controllable coupling ratio coupler for splitting the light into two portions and a controllable interferometer having two arms, one arm having an additional delay which is equal to an integer multiple of $1/\Delta f$, where $\Delta f$ is the channel spacing between adjacent wavelengths utilized in the optical system. The controllable interferometer has a controllable delay in a first or second arm for adjusting the relative phase of the light passing therethrough. A coupler combines the two signal portions from the first and second arms to form the equalized output signal. A multistage optical equalizer is implemented using a plurality of optical signal equalizers.

7 Claims, 9 Drawing Sheets

OPTICAL EQUALIZER FOR INTERSYMBOL INTERFERENCE MITIGATION

REFERENCE TO PARENT APPLICATION

This is a continuation-in-part of patent application identified as S. Chandrasekhar 19-31-80-9, Ser. No. 10/735,176, filed Dec. 12, 2003 now U.S. Pat. No. 6,804,434, and S. Chandrasekhar 14-29-66-3, Ser. No. 10/393,483, filed Mar. 20, 2003 now U.S. Pat. No. 6,785,446.

TECHNICAL FIELD OF THE INVENTION

This invention relates generally to optical equalization arrangements and, more particularly, to a method and apparatus for implementing an optical equalizer for intersymbol interference mitigation.

BACKGROUND OF THE INVENTION

Equalizers in the electrical domain to mitigate various impairments in digital optical communication systems are well known. An equalizer in the optical domain has been proposed but not demonstrated. This proposed equalizer is a multistage lattice filter with many adjustable phase parameters, the parameters chosen by complicated optimization algorithms and compensates only one wavelength channel at a time. There have been demonstrations of single impairment optical compensators, such as chromatic dispersion (CD) compensators and polarization-mode dispersion (PMD) compensators, but these address only one source of impairment at a time.

What is desired is a simple multi-channel optical equalizer for intersymbol interference mitigation which can compensate many wavelength channels of a multiwavelength signal simultaneously and which requires few adjustable parameters.

SUMMARY OF THE INVENTION

In accordance with the present invention, we disclose a method and apparatus for implementing a less-complex single or multi-channel optical equalizer for intersymbol interference mitigation which, if so desired, can compensate many wavelength channels simultaneously and which requires fewer adjustable parameters. According to another aspect of our invention, when a semiconductor optical amplifier is used together with our optical equalizer, our optical equalizer can compensate for overshoots and signal transition degradations of the semiconductor optical amplifier. Our equalizer method and apparatus is extremely simple, having only two control signals (four in special cases), and yet can compensate many wavelength channels simultaneously. In one embodiment our equalizer includes a single Mach-Zehnder interferometer (MZI) with a free-spectral range of 50 GHz (an integer multiple of the channel spacing) and tunable couplers. In electrical equalizer terminology, our equalizer is a single-tap linear equalizer. Our equalizer can dramatically improve the performance of non-return-to-zero (NRZ), carrier-suppressed return-to-zero (CSRZ), and possibly other transmission formats impaired by intersymbol interference. It can mitigate many impairments simultaneously, including those due to transmitter and/or receiver imperfections, filter narrowing, CD, and PMD. Our equalizer is especially dramatic in its improvement of the non-return-to-zero (NRZ) amplitude-shift keying (ASK) format, which is significant since this is the least expensive format to generate and detect.

More particularly, our optical signal equalizer simultaneously equalizes one or more received signals modulated at a preselected modulation bit rate in an optical system, the equalizer comprising a first coupler with a variable coupling ratio for splitting the light into two or more portions;

a controllable interferometer unit having two or more arms, each arm receiving one portion, at least one arm having an additional delay which is equal to an integer multiple of $1/\Delta f$, where $\Delta f$ is the channel spacing between adjacent wavelengths utilized in the optical system;

at least one arm having a controllable delay unit for adjusting the relative phase of the light passing through that arm;

and a second coupler for combining the signals from the arms.

In another embodiment, the optical signal equalizer for equalizing a received optical signal modulated at a preselected modulation bit rate is implemented using two or more equalizer units. In yet another embodiment, the two or more equalizer units can be implemented to share couplers. In a further embodiment, our optical signal equalizer is coupled to the output of an optical transmitter and adjusted so as to mitigate transmitter output intersymbol interference caused by imperfections in the transmitter.

According to our method of operating an optical equalizer of an optical system, we equalize a received optical signal modulated at a preselected modulation bit rate using the steps of:

splitting the light into two or more variable portions;

creating a differential delay between the two or more of the portions, which is approximately equal to an integer multiple of $1/\Delta f$, where $\Delta f$ is the channel spacing between adjacent wavelengths utilized in the optical system, adjusting the phase of the light in one of the two or more portions, combining the two or more portions into a single output, and whereby the variable adjustments are made so as to mitigate intersymbol interference impairments in the received optical signal.

Another embodiment of our invention is directed to an optical signal equalizer coupled between an output of an optical transmitter and an optical apparatus, a transmitter output signal having a degradation caused by an imperfection in the transmitter, the equalizer comprising a first coupler with a variable coupling ratio for splitting the light from the output of the optical transmitter into two or more portions;

a controllable interferometer unit having two or more arms, each arm receiving one portion, at least one arm having an additional delay;

at least one arm having a controllable delay unit for adjusting the relative phase of the light passing through that arm, wherein the variable coupling ratio of the first coupler and the controllable delay unit are adjusted so as to mitigate said transmitter output signal degradation caused by the imperfection in the transmitter; and and a second coupler for combining the portions from the arms.

Yet another embodiment of our invention is directed to a multistage optical signal equalizer of an optical system for equalizing one or more received signals modulated at a preselected modulation bit rate, the multistage equalizer comprising a first coupler with a variable coupling ratio for splitting the light into two or more variable portions;

a first controllable interferometer unit having two or more arms, each arm receiving one variable portion, at least one arm having an additional delay which is equal to an integer multiple of $1/\Delta f$, where $\Delta f$ is the channel spacing between adjacent wavelengths utilized in the optical system, at least one arm of the first controllable interferometer unit having a controllable delay unit for adjusting the relative phase of the light passing through that arm;

a second coupler for generating two or more variable output portions that are each a combination of two or more variable input portions received from the two or more arms of the first controllable interferometer unit;

a second controllable interferometer unit having two or more arms, each arm receiving one variable output portion from the second coupler, at least one arm having an additional delay which is equal to an integer multiple of $1/\Delta f$, where $\Delta f$ is the channel spacing between adjacent wavelengths utilized in the optical system, at least one arm of the second controllable interferometer unit having a controllable delay unit for adjusting the relative phase of the light passing through that arm; and a third coupler for combining the variable portions from the arms of the second controllable interferometer unit.

According to another operating aspect of our invention, we describe a method of equalizing one or more received signals modulated at a preselected modulation bit rate in an optical system, the method comprising the steps of:

(a). splitting the received signal light into a first group of signals including two or more variable portions;

(b). creating a differential delay between the two or more of the variable portions of the first group of signals, which is approximately is equal to an integer multiple of $1/\Delta f$, where $\Delta f$ is the channel spacing between adjacent wavelengths utilized in the optical system;

(c). adjusting the phase of the light in one of the two or more variable portions of the first group of signals;

(d). generating a second group of signals including two or more variable portions that are each a combination of the two or more variable portions of the first group of signals generated in the phase adjusting step (c);

(e). creating a differential delay between the two or more of the variable portions of the second group of signals, which is approximately is equal to an integer multiple of $1/\Delta f$, where $\Delta f$ is the channel spacing between adjacent wavelengths utilized in the optical system;

(f). adjusting the phase of the light in one of the two or more variable portions of the second group of signals; and (g). combining the resulting two or more variable portions of the second group of signals from the phase adjusting step (f).

BRIEF DESCRIPTION OF THE DRAWINGS

The present invention will be more fully appreciated by consideration of the following Detailed Description, which should be read in light of the accompanying drawing in which.

In the following description, identical element designations in different figures represent identical elements. Additionally in the element designations, the first digit refers to the figure in which that element is first located (e.g., 101 is first located in FIG. 1).

DETAILED DESCRIPTION

In a digital binary ASK system, performance is measured by the "eye" opening at the decision time. Intersymbol interference (ISI) is the spreading of energy from bit slots into other bit slots, causing eye closure. In a digital binary ASK system whose performance is limited by optical amplifier noise, a significant source of eye closure is due to unwanted signal energy in the "0"s or "spaces" data bit (e.g., 331, 333 in FIG. 3) beating with spontaneous emission. If one can improve the extinction ratio of the "0"s (e.g., 371, 373 of FIG. 3), one can dramatically improve the performance. In an optically amplified system, any energy in the spaces ("0"s) is much more problematic than fluctuations in the mark ("1") level, because of signal-spontaneous emission beat noise. The main purpose of our optical equalizer is to eliminate energy in the spaces ("0") at the decision time. This is why an optical equalizer can be much more effective than an electrical equalizer for many kinds of impairments—in the electrical domain at the receiver it is too late to clean up the spaces to avoid the signal-spontaneous beat noise.

Our equalizer cleans up the spaces by taking a controllable portion of the energy at each time instant (e.g., 341 of FIG. 3) and adding it ±20 ps away, which is very close to the bit period for 40 Gb/s signals (e.g., 342 of FIG. 3), with a controllable phase adjustment. For example, a low cost transmitter usually has a poor extinction ratio in the solitary spaces (spaces with adjacent marks). The equalizer can add energy from the surrounding marks to these with 180° phase, fixing the extinction ratio. As another example, first-order chromatic dispersion has a symmetric complex impulse response. The equalizer can generate a symmetric complex impulse response that approximately cancels the dispersion.

Figure 1:
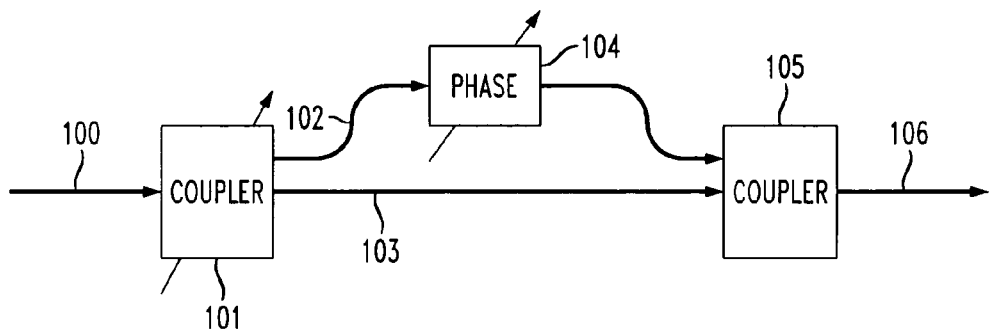
FIG. 1 illustrates a preferred embodiment of our optical signal equalizer for equalizing one or more received signals modulated at a preselected modulation bit rate in a multi-wavelength system.

FIG. 1 illustrates a preferred embodiment of our optical signal equalizer for equalizing one or more received signals 100 modulated at a preselected modulation bit rate in an optical system. Our equalizer includes a coupler 101 with a variable coupling ratio for splitting the light into two portions, arms 102 and 103. A controllable interferometer means 101-105 has two arms 102 and 103, the first arm 102 receiving the first of the two portions, the second arm 103 receiving the second of the two portions. The first arm 102 having an additional path length which creates an additional delay that is equal to an integer multiple of $1/\Delta f$, where $\Delta f$ is the channel spacing between adjacent wavelengths that may be utilized by the optical system. Thus, when the optical system is a multiwavelength system $\Delta f$ is the spacing between channels. When the optical system uses only a single wavelength, e.g., an add/drop multiplexer, where $\Delta f$ is the channel spacing between adjacent wavelengths that may be utilized by that add/drop multiplexer. The first arm 102 has a controllable phase delay 104 for adjusting the relative phase of the light passing through. Note that the controllable phase 104 has a range of ±180 degrees and could also have been located in the second arm 103. A coupling means 105 then combines the signal portions from the first and second arms to form an equalized output signal 106. By controlling the relative optical signal magnitude 101 and phase 104 of the two signal portions in arms 102 and 103, our equalizer improves the extinction ratio of the "0"s at the decision point. While coupler 101 is shown as having a variable coupling ratio and coupler 105 having a fixed coupling ratio, coupler 105 could also have a variable coupling ratio. Moreover in another embodiment, coupler 105 can have the variable coupling ratio and coupler 101 have the fixed coupling ratio. The coupler 101, coupler 105, and/or the phase delay 104 could be set at the factory or made adjustable in the specific application.

Figure 2A:
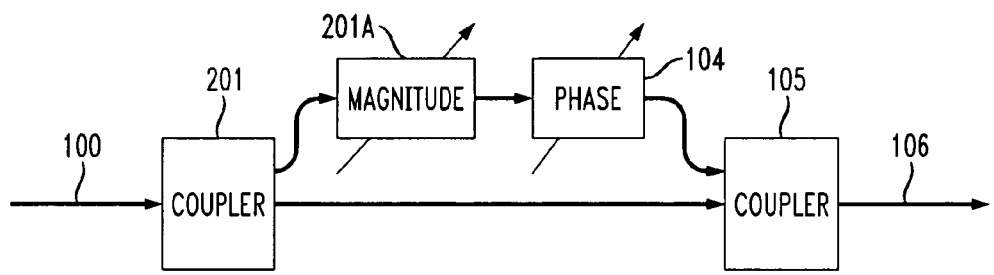
FIGS. 2A and 2B illustrate other embodiments of our optical signal equalizer.

FIG. 2A illustrates another embodiment of our optical signal equalizer. In this embodiment the only difference over FIG. 1 is that the variable coupling ratio coupler 101 of FIG. 1 is implemented using a fixed ratio coupler 201 having two output arms and a controllable transmission unit 201A located in either the first arm (as shown) or second arm for adjusting ratio of the magnitudes of the two portions. Thus, fixed ratio coupler 201 and controllable transmission unit 201A perform the function of variable coupling ratio coupler 101 of FIG. 1. The embodiment of FIG. 1 is preferable to the FIG. 2A embodiment since it has a lower loss.

Figure 2B:
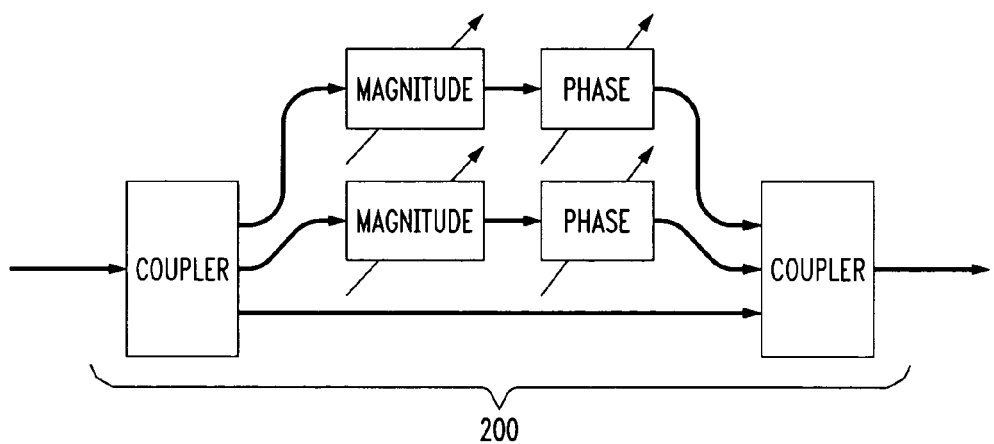

FIG. 2B illustrates yet another embodiment of our optical signal equalizer. The only difference over FIG. 2A is that the interferometer 200 has three arms, with the time delay differences between any two arms of the three being equal to an integer multiple of 1/(the channel spacing in frequency).

Figure 3:
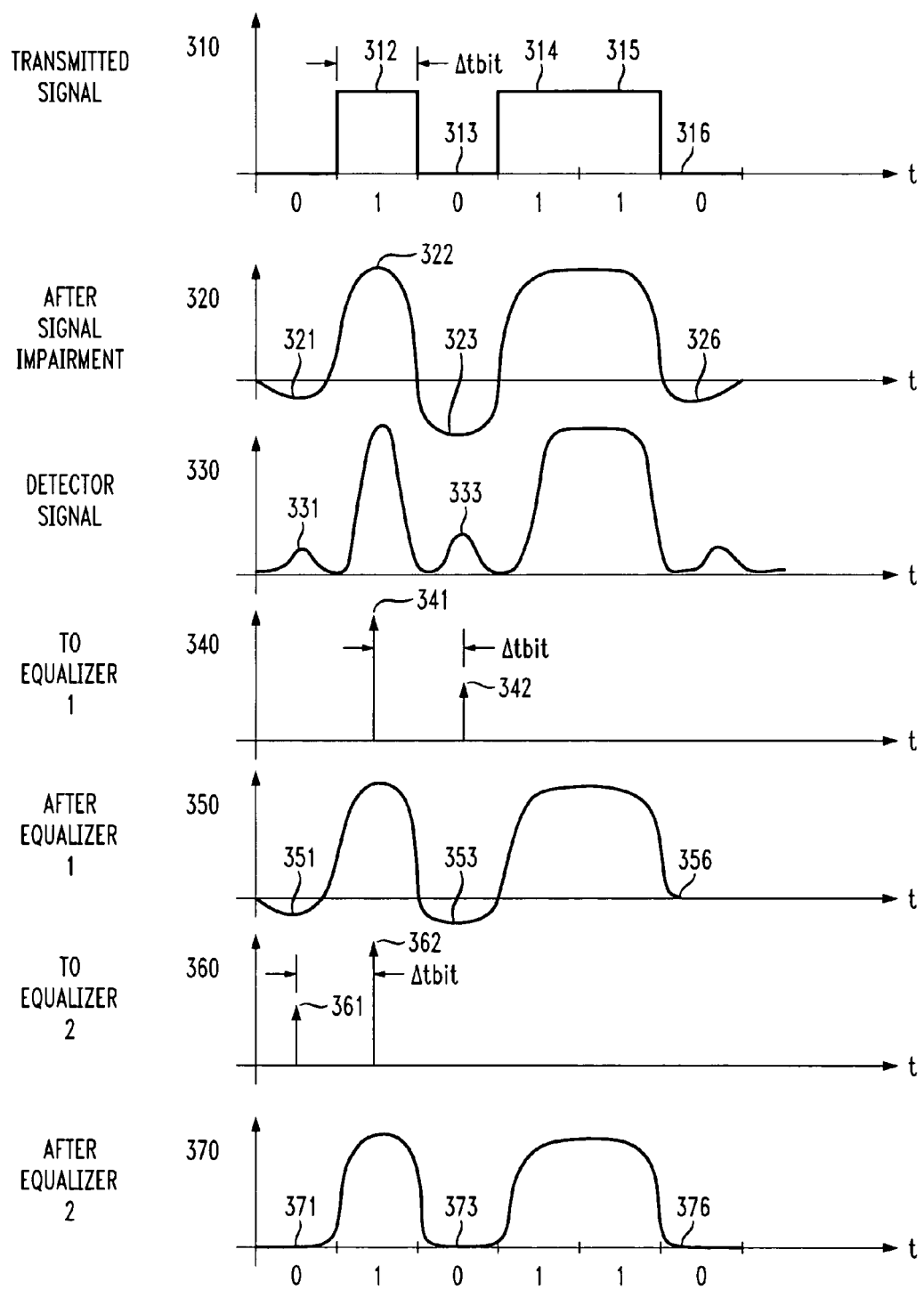
FIG. 3 illustratively shows the effect of our equalizer on received optical signals.

With reference to FIG. 3, we can look at the optical signals in the time domain to understand how our equalizer improves the extinction ratio of the "0"s at the decision point. As shown by 310, the input is a non-return-to-zero (NRZ) amplitude-shift keying (ASK) optical data signal, "010110," which is transmitted from a transmitter location (e.g., 801 of FIG. 8). Impairments such as an imperfect transmitter and/or receiver, filter narrowing, and CD cause some of the energy from each bit ("1" bit) to fall into its neighbors bit ("0" bit). For this example, the spilled energy is out of phase with the original signal. As shown by 320 this signal impairment is 321 and 323. Note that bit 312 is defined a solitary bit, a bit with both neighbors different from it. A solitary bit would add energy to both of its adjacent "0" bits, as shown by 321 and 323. The additional energy in "0" bit 323 is the added energy from the "1" bit 314. Without equalization, the detector (a square law detector) would be decoding a signal that has a power that looks like 330, with significant energy in the "0" bit locations 331 and 333. Our equalizer of FIG. 1 (or equalizer 400 of FIG. 4) has an impulse response as shown in 340. It generates a controllable amount of energy or compensation signal 342 (using variable ratio coupler 101) and adds it to the signal at locations +20 ps ($\Delta t$ bit) away, which is very close to the bit period for 40 Gb/s signals, with a controllable phase (controllable delay 104).

The controllable magnitude 101 and phase 104 of the equalizer of FIG. 1, are chosen so as to generate an energy signal 342 which is used to cancel out the added energy 323 to the neighboring bits caused by transmission impairments, especially concentrating on minimizing the power in the "0"s at the decision point 333. Shown in 350 is the result of the equalization by the equalizer of FIG. 1. As shown by 356, the equalizer of FIG. 1 will compensate for that portion of the impairment in the "0" bit, 326, located +20 ps ($\Delta t$ bit) away from the "1" bit 315. Note however that the equalizer of FIG. 1 only compensates for that portion of the impairment in the "0" bit, 323, located +20 ps ($\Delta t$ bit) away, which was caused by solitary bit 311, but does not compensate for the portion of the impairment in the "0" bit, 353, caused by the "1" bit 314. Similarly, the impairment in the "0" bit, 331, located −20 ps ($\Delta t$ bit) away, which was caused by solitary bit 311, is not compensated by the equalizer of FIG. 1. It should be noted that a second equalizer 420 is needed to compensate for impairments to a "0" bit position which is −20 ps ($\Delta t$ bit) away (i.e., the impairment caused in "0" bit position 323 by "1" bit 314). Such a second equalizer (not shown in FIG. 1) would be connected in series, so that its output connects to the input of equalizer of FIG. 1. The second equalizer can be implemented and operate in the same manner as the first equalizer 1 of FIG. 1, except that couplers 101 and 105 would now be adjusted so as to cause the largest contribution of the impulse response to come from the longer interferometer arm. As will be discussed with reference to FIG. 4, the first equalizer can also be implemented as shown by 400 and the second equalizer as shown by 420.

Figure 4:
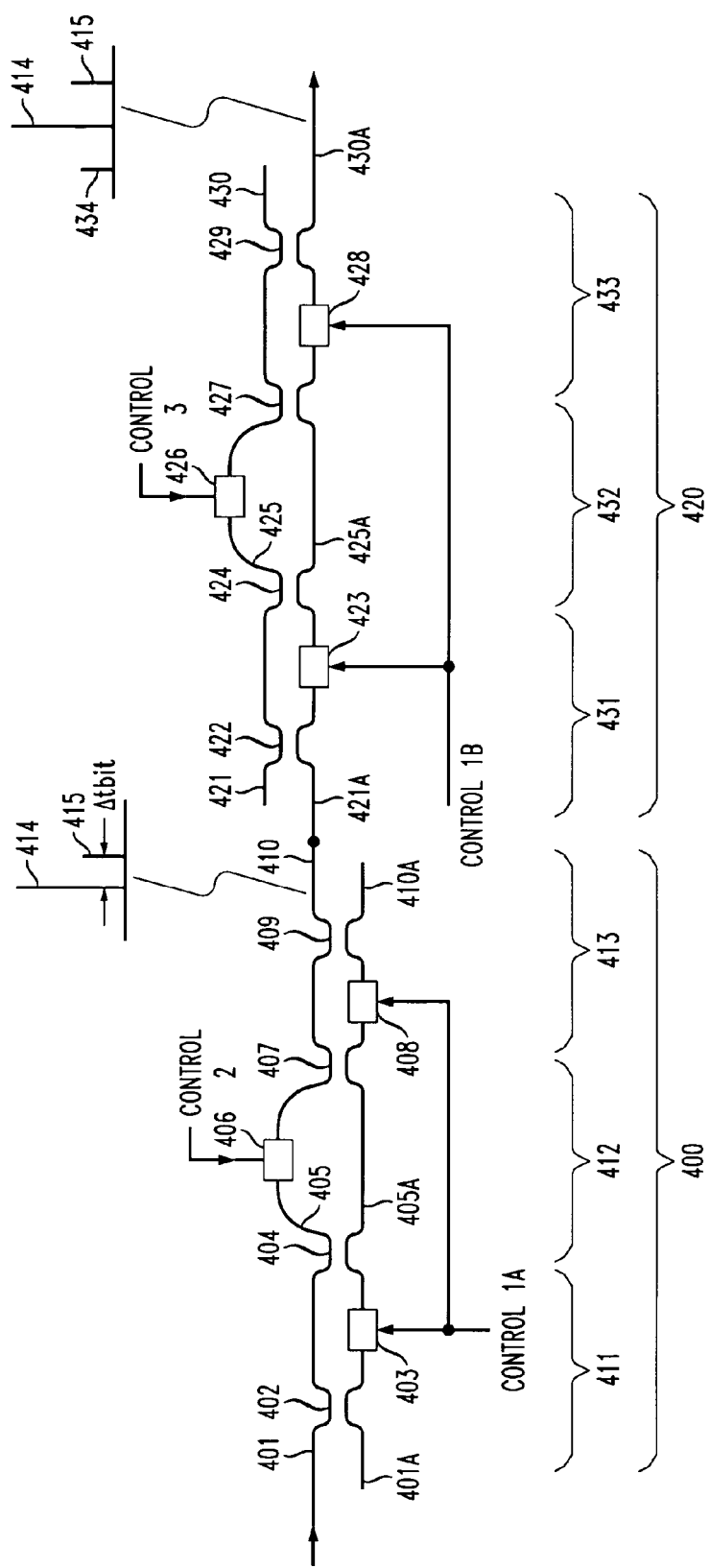
FIG. 4 shows another embodiment of our optical signal equalizer implemented using a first and second equalizer units.

With joint reference to FIGS. 3 and 4, as shown in 360, the second equalizer 420 takes a controllable amount of energy (using variable ratio coupler 423) from bit 362 and adds it to the signal at locations −20 ps ($\Delta t$ bit) away 361. As will be discussed later, the operation of the second equalizer 420 operates in essentially the same manner as the equalizer of FIG. 1 (or equalizer 400 of FIG. 4) except that it affects "0" bit locations −20 ps away rather than +20 ps away. Thus, as shown in 370, the second equalizer 420 compensates for the "0" bit impairments 351 and 353 to produce the equalized "0" bit shown by 371 and 373, respectively.

As a result, our equalizer provides an especially dramatic improvement in a reduced bit error rate (BER) in the transmission of data signals (because of the more accurate detection of the "0" bits) that utilize a non-return-to-zero (NRZ) amplitude-shift keying (ASK) format. Our equalizer can also dramatically improve the performance of carrier-suppressed return-to-zero (CSRZ), and possibly other transmission formats impaired by intersymbol interference. It can also mitigate many impairments simultaneously, including those due to transmitter and/or receiver imperfections, filter narrowing, CD, and PMD.

In summary, using a first and second equalizer (e.g., 400 and 420 of FIG. 4) the "0" bit impairments 321, 323, and 326 can be minimized to be as shown by 371, 373, and 376, respectively. It should be noted that the above-described equalization operation of the two equalizers works for an optical system if the channel spacing is equal to N (an integer) times the free spectral range (FSR) (i.e., an integer multiple of 1/Δf, where Δf is the channel spacing) and the data bit rate is essentially the same for all channels.

FIG. 4 shows another embodiment of our optical signal equalizer implemented using a first, 400, and second, 420, equalizer units. The first equalizer 400 includes a first variable ratio coupler 411, a controllable interferometer 412, and a second variable coupling ratio coupler 413. The variable ratio coupler 411 includes a fixed ratio (e.g., 50/50) coupler 402 and a controllable variable phase (0±90 degrees) element 403. Illustratively, each variable ratio coupler 411 and 413 may be implemented as a small Mach-Zehnder interferometers (MZI) (402, 403, 404) with a controllable thermooptic phase shifter 402 in one arm and a quarter-wavelength length increase in the other arm.

The coupler unit 411 includes a fixed ratio coupler 402 to receive an optical signal at input 401 (note, input 401A is unconnected) and a controllable variable phase element 403 to control the relative phase of the optical signals applied to controllable interferometer 412. Controllable interferometer 412 includes two fixed ratio (e.g., 50/50) couplers 404 and 407 interconnected by two waveguide arms 405 and 405A. The first arm 405 having an additional delay which is equal to an integer multiple of 1/Δf, where Δf is the channel spacing of the received optical signals of the multiwavelength system, the additional delay is approximately equal to one modulation bit period. The first arm 405 also has a controllable phase shifter 406 (0-360 degrees) for adjusting the phase of 415 with respect to 414. The coupler 407 is used to recombine the optical signals from arms 405 and 405A. The coupler unit 413 includes a controllable variable phase (0±90 degrees) element 408 and a fixed ratio (e.g., 50/50) coupler 402. The variable ratio coupler 413 receives the optical signal from waveguide arms 405 and 405A of controllable interferometer 412 and controllable transmission unit 408 adjusts the relative phase of the optical signal into coupler 409. Note, the controllable transmission units 403 and 408 together control magnitude adjustments in equalizer 400. Additionally, the controllable transmission units 403 and 408 can both be located in the same or in the opposite arms of coupler units 411 and 413. Coupler 409 combines the optical signals and the output signal on output 410 is applied to the lower input 421A of second equalizer unit 420. At output 410, the main "1" bit signal is 414 and the "0" bit compensation or satellite signal is 415. The second output 410A of coupler 409 is unconnected. Illustratively, controllable interferometer 412 may be implemented as a MZI (404, 406, 407) with a controllable thermooptic phase shifter 406 in one arm and also has an additional delay which is equal to an integer multiple of 1/Δf.

The implementation of second equalizer 420 is identical to the first equalizer 400. In equalizer 420 the elements 421 through 433 operate in the same manner as above-described for elements 401 through 413 of the first equalizer 400. However, the inputs 421 and 421A and outputs 430 and 430A of second equalizer 420 are connected in a different manner than the inputs 401 and 401A and outputs 410 and 410A of the first equalizer 400. In equalizer 400 the upper input port 401A and upper output port 410 are used while in equalizer 420 the lower input port 421A and lower output port 430A are used. Thus, in equalizer 420 the lower input 421A connects to the upper output 410 of equalizer 400. The output 430A of equalizer 420 has a main "1" bit signal 414 and both a leading (+Δt bit), 415, and a trailing (−Δt bit), 434, "0" bit compensation or satellite signal.

Control #1A controls both the controllable phase delay units 403, 408 of equalizer 400, and Control #1B controls the controllable phase delay units 423 and 428 of equalizer 420. A Control #2 sets the controllable phase shifter 406 for adjusting the phase of 415. A Control #3, sets the controllable phase shifter 426 for adjusting the phase of 434. The impulse responses of many realistic impairments are symmetric, so in many cases Control #1A and Control #1B can be driven with the same value, leaving a total of three controls for the equalizer. The controllable phase shifters 406 and 426 may each be implemented using a thermooptic phase shifter. Controllable interferometer 412 and 432 can both be implemented as Mach-Zehnder interferometers (MZIs).

Thus, the equalizer of FIG. 4 may be implemented essentially using two identical MZIs in series with tunable couplers, each MZI having a free-spectral range of 50 GHz. Note that the controllable interferometers 412 and 432 can also be implemented using fixed couplers as in FIG. 2, but with controllable attenuators in the MZI arms. The two MZIs are connected by a single mode, and so this structure is not a lattice structure [3]. Our structure is more straightforward to control and has less polarization and wavelength sensitivity than a lattice structure. In electrical equalizer terminology, our equalizer of FIG. 4 is a two-tap linear equalizer. It is designed to compensate 40 Gb/s channels on an integer multiple of 50 GHz grid. It can dramatically mitigate many intersymbol interference impairments, such as transmitter bandwidth and extinction ratio limitations, filter narrowing, chromatic dispersion, and polarization-mode dispersion. The equalizer is especially dramatic in its improvement of the non-return-to-zero (NRZ) amplitude-shift keying (ASK) format, which is significant since this is the least expensive format to generate and detect.

Figure 5A:
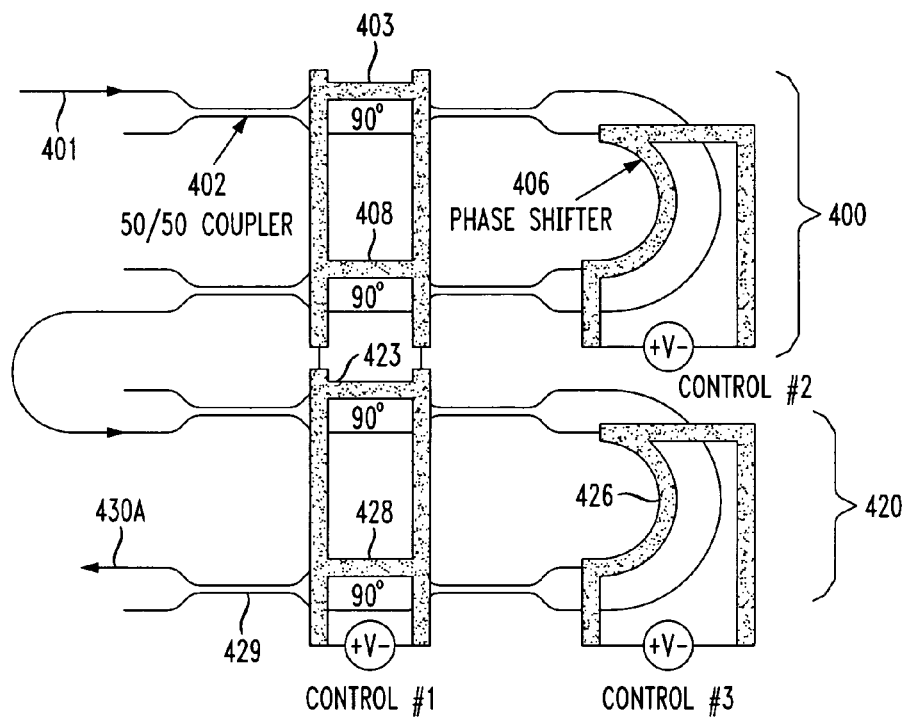
FIG. 5A shows another arrangement of the two equalizer units of FIG. 4
Figure 5B:
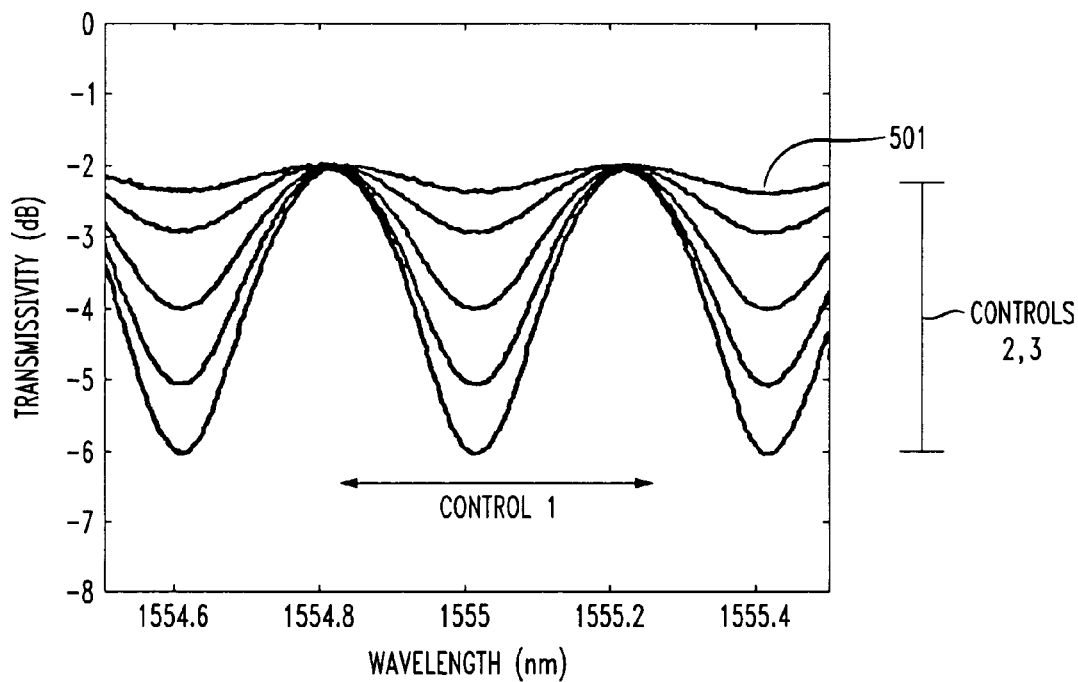
FIG. 5B shows the transmissivity through one equalizer for different coupler drive voltages and a fixed phase voltage.

Shown in FIG. 5A is another arrangement of the two equalizer units of FIG. 4 and FIG. 5B shows the measured transmissivity through one equalizer for different coupler drive voltages and a fixed phase voltage. As shown in FIG. 5A, each equalizer unit, e.g., 400, has two tunable couplers, 403 and 408, and a thermooptic phase shifter, 406, in one arm. This biasing of the tunable coupler MZI's significantly reduces polarization-dependent loss (PDL). Both couplers in each MZI 400, 420 should always be at the same value, in order to minimize insertion loss, so the controls for couplers 403, 408, 423, 428 are connected together as Control #1. More generally, the couplers of each of the equalizer units 400 and 420 can have separate controls, Controls #1A and #1B. Such an equalizer would then have four control signals, each controlling approximately one of the following: the amplitude and phase of the left and right satellite pulses (see 342, 361 of FIG. 3) of the equalizer impulse response. Furthermore, mainly only higher order chromatic dispersion significant enough to distort a channel will require an asymmetric equalizer impulse response (which would require a different control signal voltage Control #1A for couplers 403, 408 of equalizer 400 and a Control #1B for couplers 423, 428 of equalizer 420). FIG. 4, assumes no significant higher order chromatic dispersion and thus all the couplers connect to the same voltage source Control #1. Thus we used only three control signals Controls #1, #2, and #3 to obtain the results presented in the following section. The measured transmissivity through one of the MZI's for different coupler drive voltages and a fixed phase voltage is shown in FIG. 5B. The ripple 501 could not be tuned all the way to zero because of imperfect directional coupling ratios. The fiber-to-fiber insertion loss, including one connector, is 2.0 dB, and the PDL is <0.5 dB for one stage.

Figure 9:
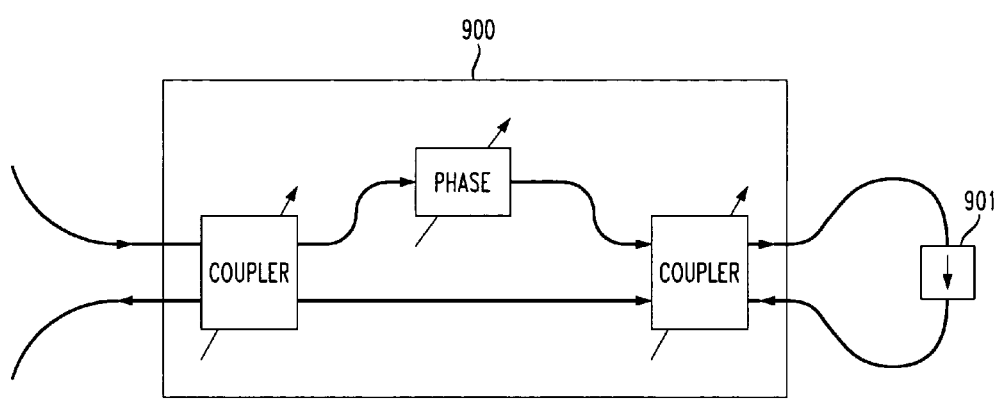
FIG. 9 shows another arrangement of the equalizer of FIG. 1.

FIG. 9 shows another embodiment of the optical equalizer. In this case, the same interferometer 900 is used twice. The signal passes once through the interferometer 900, passes through a unidirectional element 901 such as an optical isolator or circulator, and reenters the interferometer 900. The first pass will create a satellite in the impulse response on one side (415) and the second pass will create a satellite on the other side (434). The advantage of this configuration is that only one interferometer is required. The disadvantage is that the magnitudes and phases of the impulse response satellites cannot be individually controlled as in the FIG. 4 embodiment.

Equalizer Results

For an optical transmission systems operating at 40 Gb/s, one often uses return-to-zero (RZ) formats, mainly to improve ISI tolerance. For example, RZ formats show an increased tolerance to polarization-mode dispersion (PMD). However, RZ formats usually require two modulators to generate them, making RZ transmitters expensive, complex, and lossy. When our equalizer is used in a NRZ ASK system, it can significantly reduce the ISI impairments of this less expensive format. In fact, we demonstrate that a single equalizer can dramatically mitigate ISI for all channels simultaneously, without any need for dynamic control.

Figure 6:
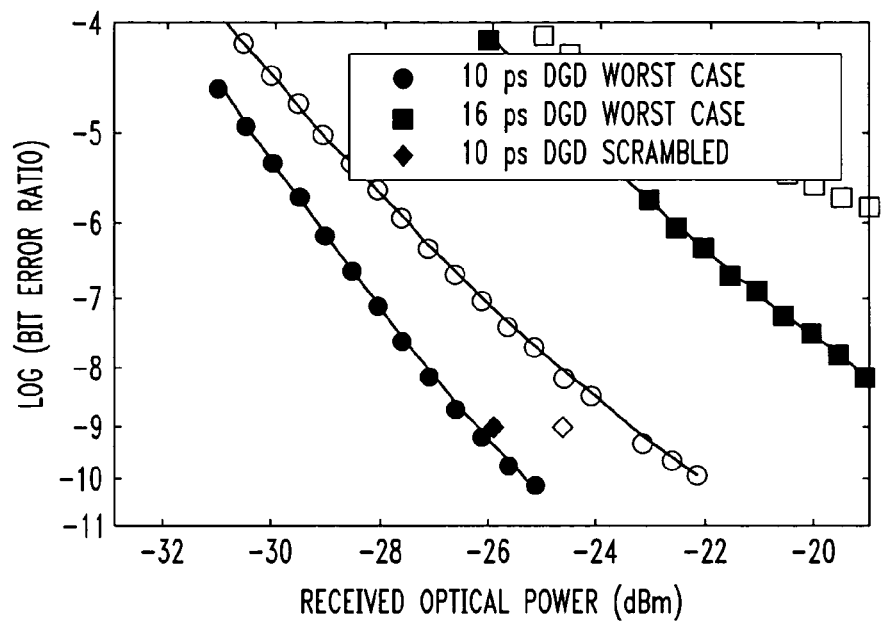
FIG. 6 shows our equalizer's measured bit-error ratio (BER) versus optical power for different signal impairments.

FIG. 6 shows illustrative performance improvement of our equalizer to compensate for differential-group-delay (DGD) and polarization-mode dispersion (PMD). In FIG. 6, the hollow and filled symbols are without and with the equalizer, respectively, and the data is 40 GBs, $2^{31}$-1 pattern. We set a DGD PMD emulator input polarization for the worst performance and then measured with and without our equalizer. After setting the equalizer for mitigating the worst-case DGD, we then changed the input polarization, finding that the BER never became worse. To further check this, we inserted a polarization scrambler before the emulator and measured the average BER, shown as the diamonds in FIG. 6. Thus this equalizer can be used as a PMD mitigator without feedback. Note that the equalizer is not compensating PMD in the true sense—it is simply sharpening the pulses, improving the PMD tolerance, in a manner similar to employing RZ formats.

Our equalizer can simultaneously mitigate the effects of three impairments, filtering, CD, and PMD, in different sets (not shown). In the case of all three impairments the equalizer took a signal with a high error floor and made it error-free at a reasonable sensitivity.

Figure 7:
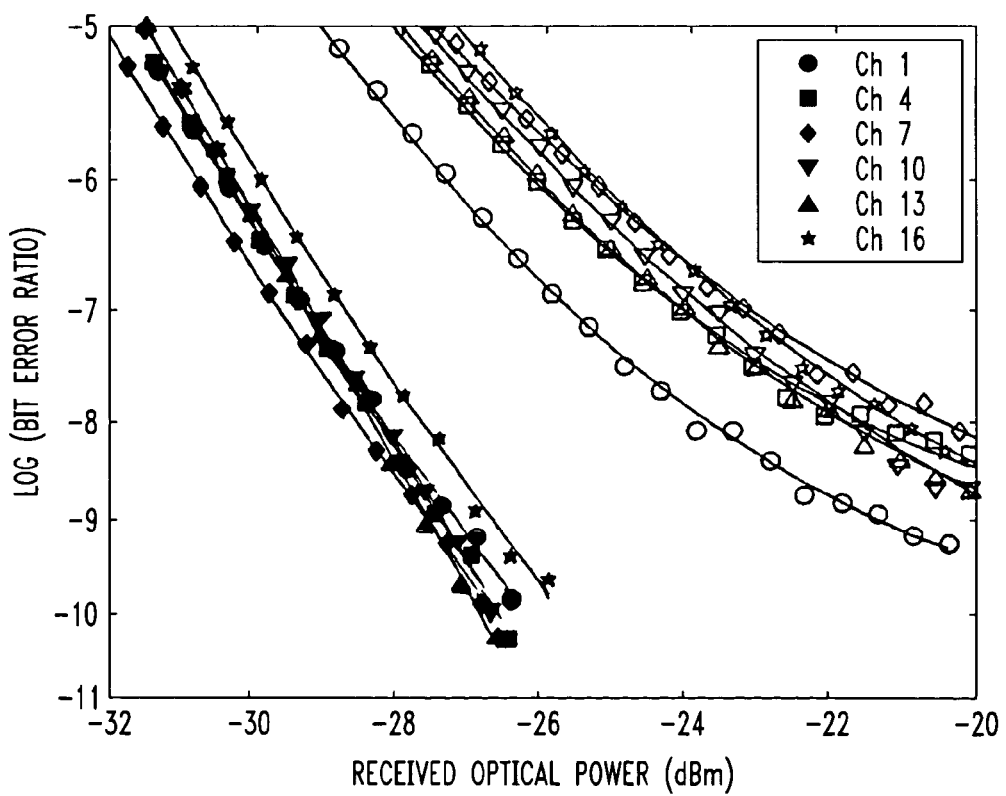
FIG. 7 shows our equalizer's measured BER versus optical power for different wavelengths with the same equalizer settings.

To verify that the equalizer can mitigate many channels simultaneously, we launched 16 channels, 100-GHz spaced, on the ITU grid, through +95 ps/nm CD and a Gaussian-passband demultiplexer. We optimized the equalizer for ch. 10, and then measured the performance with and without the equalizer, not changing any of the equalizer controls, for every third channel. As one can see from FIG. 7, the equalizer simultaneously improves all channels. FIG. 7 shows the measured bit-error ratio (BER) vs. optical power for different wavelengths with the same equalizer settings. There were 95 ps/nm CD and a Gaussian-passband demultiplexer in the line.

Figure 8A:
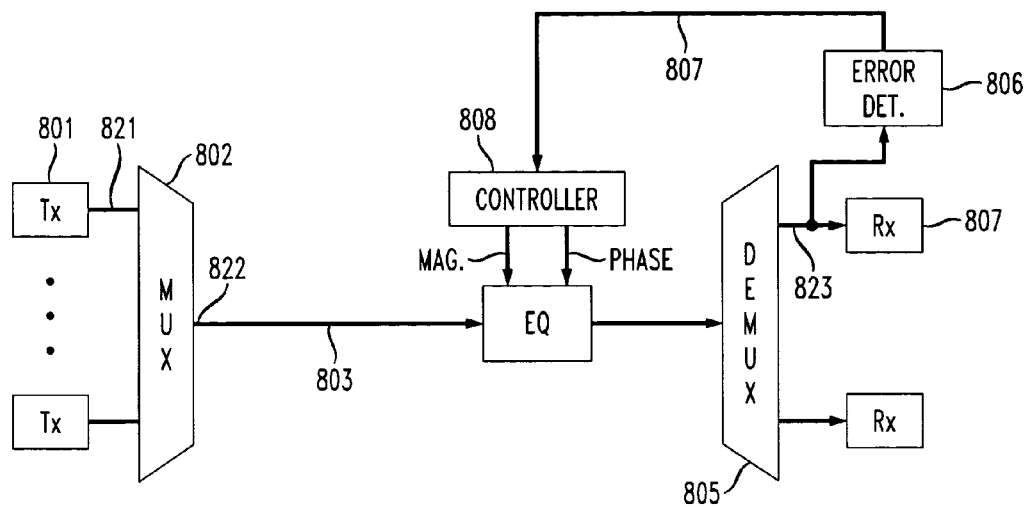
FIG. 8A shows an adaptive multiwave optical transmission system implemented using our optical equalizer and FIG. 8B shows an application of the equalizer in a multi-wavelength bus-type architecture.

Shown in FIG. 8A is an application of our equalizer as an adaptive equalizer for a multiwavelength transmission system. In FIG. 8A, a plurality of wavelengths from transmitters 801 are multiplexed together in multiplexer 802 and sent over optical path 803. At the receiver location, our adaptive equalizer 804 equalizes all of the received multiplexed channels. The output from equalizer 804 is demultiplexed in demultiplexer 805. An error detector 806 is connected to receive one of the demultiplexed wavelengths outputted to one of the receiver channels 807. The bit error rate (BER) from error detector 806 is sent over path 808 to control unit 809. Control unit 809 generates magnitude and a phase control signals that are applied to equalizer 804. The feedback loop from the error detector 806, to control unit 808 and to equalizer 804, enables the equalizer arrangement to adaptively minimize the error rate of each of the channels of the transmission system of FIG. 8A. Illustratively, control unit 808 may first try to increase the magnitude control signal to the equalizer 804, if the BER from detector 806 increased, the control unit 808 would then reduce the magnitude signal to reduce the BER, otherwise it would keep increasing the magnitude control signal until the BER increased. This operation would continue until the minimum BER is obtained. Note that the phase control signal is mostly needed for chirp control (due to CD or transmitter mostly). If the chirp is less likely to change, the phase control signal may not be needed, only the magnitude control signal would be used. The equalizer could also be placed between the demultiplexer and receiver (location 823). However, we would like to emphasize that our equalizer is also effective in a passive mode, with no dynamic adjustment. In such a case the equalizer could be placed between the transmitter and multiplexer (location 821) or just after the multiplexer (location 822). Note that in the case that only one channel is passing through the equalizer, it is still advantageous to employ our multiwavelength equalizer because then that same equalizer and setting can be used for other channels in the system, simplifying inventory, for example.

Figure 8B:
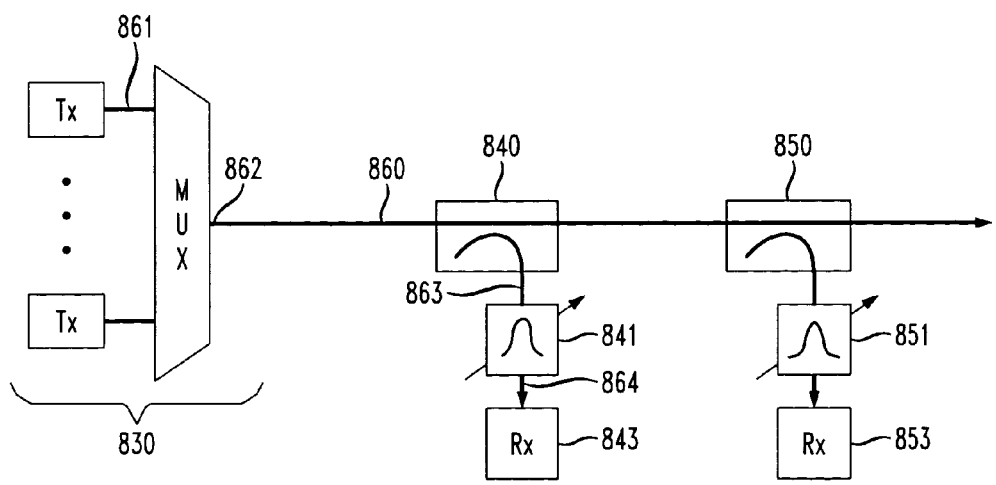

Shown in FIG. 8B is the various locations where our equalizer can be placed in a multiwavelength bus-type architecture. The multiwavelength transmitter 830 is similar to that of FIG. 8A. There are couplers 840, 850, etc., along the bus 860 connected to optical filters 841, 851, etc. and receivers 843, 853. Our equalizer (not shown) could be placed in one of a plurality of locations including locations 861, 862, 863, or 864. In many cases location 862 is preferable since in such a case all wavelength channels can be equalized simultaneously.

Finally, because this equalizer can be made in planar lightwave circuit technology, it could be integrated with other functions, such as a demultiplexer, add-drop filter, or dynamic gain equalization filter.

Equalization of Nonlinear Distortion

The previous equalization discussion concentrated on intersymbol interference arising from linear processes. We next consider the equalization of nonlinear distortion from a semiconductor optical amplifier (SOA).

Figure 10:
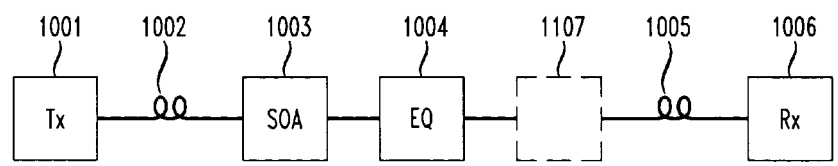
FIG. 10 shows an illustrative optical transmission system including a transmitter, an optical amplifier, our optical equalizer, and a receiver.

FIG. 10 shows an illustrative optical transmission system including an optical transmitter 1001, optical facility 1002, semiconductor optical amplifier (SOA) 1003, our optical equalizer 1004, optical facility 1005, and an optical receiver 1006. It should be noted that the optical transmission system may be implemented in a variety of alternate arrangements to that shown in FIG. 10. For example, if desired an additional SOA 1007 (note: FIG. 10 says "1107") can be added between equalizer 1004 and optical facility 1005. The SOA 1003 and optical equalizer 1004 (as well as the second SOA 1007) can be integrated together as a common element and can be located at intermediate node of the system. Alternatively, the SOA 1003 and optical equalizer 1004 can be co-located with optical transmitter 1001 at the transmitter node, where the optical transmitter 1001, amplifier 1003, and optical equalizer 1004 can all be integrated together. Note also that at the transmitter node the placement of amplifier 1003, and optical equalizer 1004 can be reversed. In another embodiment, the SOA 1003 and optical equalizer 1004 can be co-located with optical receiver 1006 at the receiver node, where the amplifier 1003, optical equalizer 1004, and optical transmitter 1001 can all be integrated together. Note that at the receiver node the amplifier 1003 will generally be located in front of the optical equalizer 1004, although the order can be reversed if desired.

Figure 11:
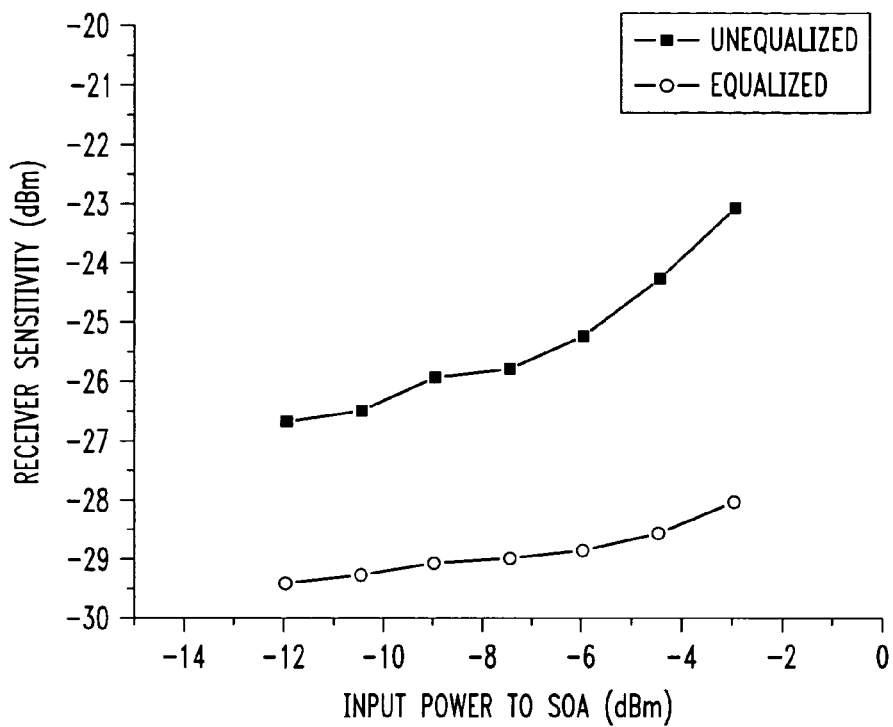
FIG. 11 shows an illustrative comparison of two data signals outputted from the optical amplifier one without equalization and the other equalized using our optical equalizer.

In an illustrative optical system including an optical transmitter (1001), SOA 1003, and an optical receiver, the performance was compared with and without the use of our equalizer. The SOA 1003 was a commercially available SOA with a fiber-to-fiber small-signal gain of 18 dB at 1550 nm at a bias current of 200 mA. The optical transmitter included an external cavity laser at 193.4 THz (1550.12 nm) and a chirp-free $LiNbO_3$ modulator that was modulated using a non-return-to-zero (NRZ) data signal at 40-Gb/s. The modulated optical was launched into the SOA at an input power that varied from −3 dBm to −12 dBm to study the degradation of the BER resulting from the nonlinearity of the SOA. For a given BER of $10^{-9}$, our equalizer provided a 5-dB improvement in receiver sensitivity for a pseudorandom bit stream (PRBS) of length $2^{31}-1$. FIG. 11 shows the receiver sensitivity both with and without equalization for a BER of $10^{-9}$ at different input powers to the SOA.

Figure 12:
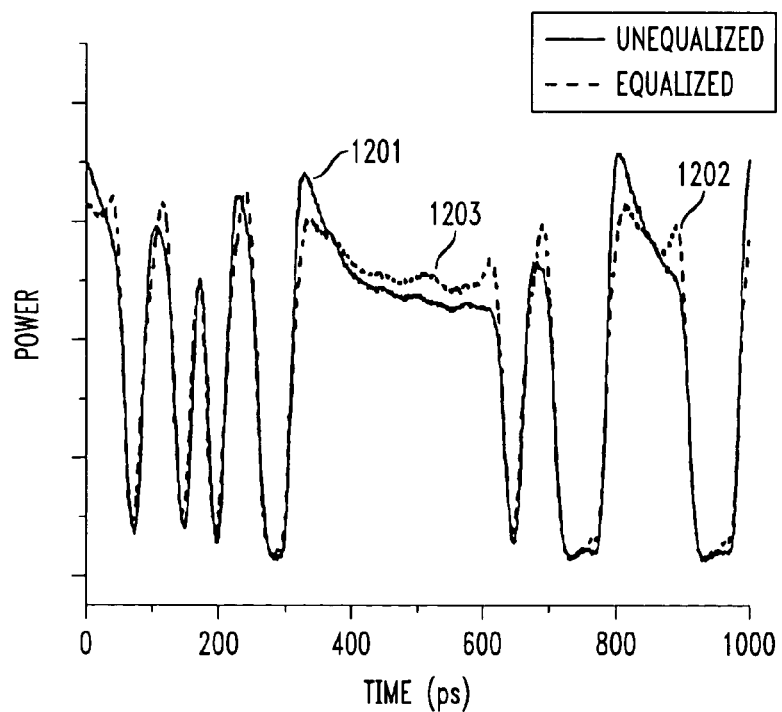
FIG. 12 shows receiver sensitivity for a given bit error rate (BER) versus input power to the optical amplifier measured with and without equalization.

Our equalizer reduced the overshoots on the '1' bits on the rising edges, i.e., the transitions from '0' to '1'. This can be seen in FIG. 12, which shows the effect of the equalizer (dotted line) on some distorted data patterns after the SOA using the fast photo-detector. In FIG. 12, the equalizer mitigates the overshoots in the '1' bits, 1201, sharpens the transitions from '1' to '0', 1202, and can flatten a long string of '1' bits in the NRZ stream, 1203. The overshoots, 1201, from the SOA leads to an increase in the average power of the data-stream, resulting in a power penalty. Thus, the use of our equalizer 1004 reduces optical signal degradations characterized by these overshoots and signal transitions. However, this improvement is small compared to the fact that the overshoots on the rising edges can cause a significant enhancement of inter-symbol interference, ISI, in the receiver. This is because generally the receiver bandwidth is ~0.7 times the bit rate, in order to optimize its performance in the presence of noise. This electrical filtering causes any overshoots to spill into neighboring bit slots. Thus the main benefit of the equalizer in this case is the reduction of overshoots which then reduced the penalty caused by electrical ISI in the receiver.

Single-Channel Transmitter-Impairment Mitigation

Figure 13:
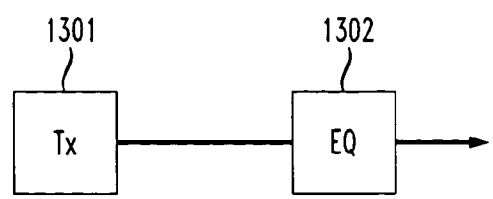
FIG. 13 shows an embodiment of our optical signal equalizer used to equalize an optical transmitter output signal.

With reference to FIG. 13, there is shown an embodiment of our optical signal equalizer 1302 coupled between an output of an optical transmitter 1301 and an optical apparatus (an optical path or device). The equalizer 1302 is used to equalize a transmitter output signal having degradation (or distortion) caused by an imperfection in the transmitter. The transmitter output signal degradations are often characterized by signal overshoots and slow signal transitions. Common transmitter imperfections are a modulation bandwidth that is too low for the signal symbol rate or an extinction ratio that is too small. The equalizer 1302 may be implemented using the arrangements shown as FIGS. 1 and 2. In such an arrangement, the variable coupler (101 of FIG. 1) controls the splitting the light into two or more variable portions and the phase unit or controllable delay unit (104 of FIG. 1) is used to adjust the relative phase of the light passing through that arm of the interferometer. The phase unit and/or the variable coupler are/is adjusted so as to mitigate said transmitter output signal degradations caused by the imperfection in the transmitter. Optimum degradation reduction may involve iterative adjustments of the phase unit 104 and variable coupler 101.

The transmitter and optical equalizer may be monolithically integrated together. For example, an InGaAsP-based electro-absorption-modulated laser may be monolithically integrated with an equalizer. In this way, one can improve the process yield by using the equalizer to "clean up" imperfections in the electro-absorption modulator.

Enhanced Equalizer Using Coherently Connected Interferometers

Figure 14:
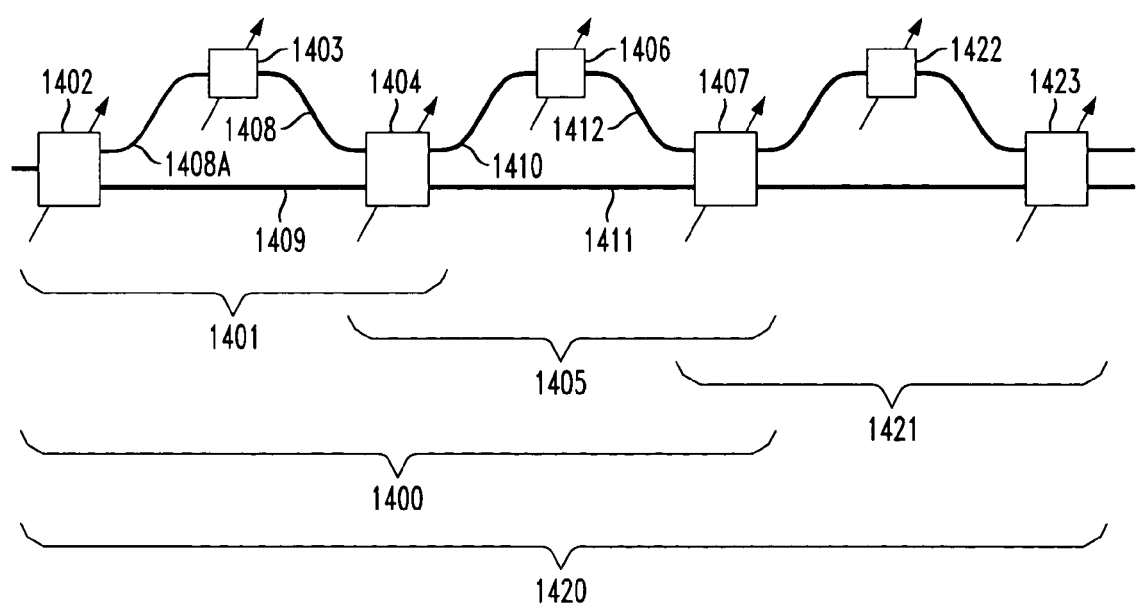
FIG. 14 shows an embodiment of a multistage optical equalizer implemented using a plurality of our optical signal equalizers connected using two-by-two couplers.

With reference to FIG. 14, there is shown an embodiment of a multistage optical equalizer implemented using a plurality of our optical signal equalizers. In a two-stage embodiment 1400 of the multistage equalizer, the first stage equalizer 1401 may be implemented using the arrangements shown as FIGS. 1 and 2A, except that the output coupler (105 of FIG. 1) is implemented as a 2×2 coupler 1404. The first stage equalizer 1401 thus includes a 1×2 variable coupler 1402, an adjustable phase unit or controllable delay unit 1403 and a 2×2 output coupler 1404. The second stage equalizer 1405 may also be implemented using the arrangements shown in FIGS. 1 and 2, except that it shares the 2×2 coupler 1404 with the first stage equalizer 1401 and that the coupling ratio of 2×2 coupler 1404 is made variable. This sharing of a 2×2 coupler is sometimes called "coherent connecting" of interferometers. The second stage equalizer 1405 thus includes the shared variable 2×2 coupler 1404, a phase unit or controllable delay unit 1406 and an output coupler 1407. The output coupler 1407 may be a 2×2 or a 2×1 coupler. For the two-stage embodiment, third stage equalizer 1421 does not exist.

In a three-stage embodiment 1420 of the multistage equalizer, a third stage equalizer 1421 is added to the above-described two-stage equalizer 1400. In this three-stage embodiment 1420, the output coupler 1407 of stage two is implemented as a 2×2 variable coupler that is shared with the third stage equalizer 1421. The third stage equalizer 1421 thus includes a 2×2 variable coupler 1407, an adjustable phase unit or controllable delay unit 1422 and an output coupler 1423. The output coupler 1423 may be a 2×2 or a 2×1 coupler.

While the two and three-stage equalizers have been described as being implemented using the equalizer designs of FIGS. 1 and 2A, the equalizer embodiment of FIG. 2B can also be used. (yes, it's true. It would be very complicated device. It would have more impulse responses in the time domain, making it more flexible in what it can equalize.)

The operation of the two-stage multistage equalizer of FIG. 14 for equalizing one or more received signals modulated at a preselected modulation bit rate in an optical system is now described. The received signal light is split by coupler 1402 into a first group of signals including two or more variable portions. The first controllable interferometer unit 1402-1404 creates a differential delay between the two or more of the variable portions on paths 1408 and 1409, which is approximately is equal to an integer multiple of 1/Δf, where Δf is the channel spacing between adjacent wavelengths utilized in the optical system. The adjustable phase unit 1403 is used to adjust the phase of the light in one of the two or more variable portions, i.e., on path 1408. The 2×2 coupler 1404 generates two or more variable output portions on paths 1410 and 1411 that are each a combination of the two or more variable portions on paths 1408 and 1409. The second controllable interferometer unit 1406-1407 creates a differential delay between the two or more of the variable portions on paths 1411 and 1412, which is approximately equal to an integer multiple of 1/Δf, where Δf is the channel spacing between adjacent wavelengths utilized in the optical system. The adjustable phase unit 1406 further adjusts the phase of the light in one of the two or more variable portions on paths 1411 and 1412. Coupler 1407 combines the two or more variable portions on paths 1411 and 1412. When a third-stage equalizer 1421 is used it operates in the same manner as described for the second-stage equalizer.

The two-stage multistage equalizer 1400 can be used as a wavelength de/multiplexer in a similar manner to the wavelength de/multiplexer described in the publication by T. Chiba et al, entitled Chromatic dispersion free Fourier transform-based wavelength splitters fo D-WDM, published in the Fifth Optoelectronics and communications Conference (OECC 2000) Technical Digest, July 2000. In such an arrangement, in the first interferometer 1401 the path lengths 1408/1408A and phase unit 1403 would introduce an additional delay which is equal to an integer multiple of 1/Δf (where Δf is the channel spacing of the received optical signals of the multiwavelength system) over what is introduced in path length 1409. In the second interferometer 1405 the path lengths 1410/1412 and phase unit 1406 would introduce an additional delay which is equal to an integer multiple of 2/Δf over what is introduced in path 1411. The adjustments of couplers 1402 and 1404 and phase units 1403 and 1406 would be used to provide both sufficient crosstalk for the de/multiplexer and appropriate equalization for the signals.

We claim:

1. An optical signal equalizer coupled between an output of an optical transmitter and an optical apparatus, a transmitter output signal having a degradation caused by an imperfection in the transmitter, the equalizer comprising:
    a first coupler for splitting the light from the output of the optical transmitter into two or more portions;
    a controllable interferometer unit having two or more arms, each arm receiving one portion,
        wherein at least one of the arms exhibits an additional delay which is substantially equal to an integer multiple of 1/Δf, where Δf is the channel spacing between adjacent wavelengths of the transmitter output signal, and
        wherein at least one of the arms has a controllable delay unit for adjusting the relative phase of the light passing through that arm; and
    a second coupler for combining the portions received from the two or more interferometer arms;
    wherein at least one of said couplers has a variable coupling ratio, and the coupling ratio of the at least one of said couplers and the amount of delay in the controllable delay unit are adjusted to generate an equalized signal at the output of the second coupler, thereby mitigating said transmitter output signal degradation caused by the imperfection in the transmitter.

2. The optical signal equalizer of claim 1, wherein the transmitter imperfection may be one or more of a group of imperfections including a limited modulation bandwidth, a limited extinction ratio, and a non-flat modulation transfer function.

3. A multistage optical signal equalizer of an optical system for equalizing one or more received signals modulated at a pre-selected modulation bit rate, the multistage equalizer comprising:
    a first coupler with a variable coupling ratio for splitting the light into two or more variable portions;
    a first controllable interferometer unit having two or more arms, each arm receiving one variable portion, at least one arm having an additional delay which is equal to an integer multiple of 1/Δf, where Δf is the channel spacing between adjacent wavelengths utilized in the optical system, at least one arm of the first controllable interferometer unit having a controllable delay unit for adjusting the relative phase of the light passing through that arm;
    a second coupler for generating two or more variable output portions that are each a combination of two or more variable input portions received from the two or more arms of the first controllable interferometer unit;
    a second controllable interferometer unit having two or more arms, each arm receiving one variable output portion from the second coupler, at least one arm having an additional delay which is equal to an integer multiple of 1/Δf, where Δf is the channel spacing between adjacent wavelengths utilized in the optical system, at least one arm of the second controllable interferometer unit having a controllable delay unit for adjusting the relative phase of light passing through that arm; and
    a third coupler for combining the variable portions from the arms of the second controllable interferometer unit.

4. The multistage equalizer of claim 3, wherein the third coupler has two outputs, to enable the multistage equalizer to function as a multiplexer or demultiplexer.

5. The multistage equalizer of claim 3 arranged as a three-stage equalizer, wherein the third coupler generates two or more variable portions that are each a combination of portions from the arms of the second controllable interferometer unit;
    a third controllable interferometer unit having two or more arms, each arm receiving one variable output portion from the third coupler, at least one arm having an additional delay which is equal to an integer multiple of 1/Δf, where Δf is the channel spacing between adjacent wavelengths utilized in the optical system, at least one arm of the third controllable interferometer unit having a controllable delay unit for adjusting the relative phase of the light passing through that arm; and
    and a fourth coupler for combining the variable portions from the arms of the third controllable interferometer unit.

6. The multistage equalizer of claim 5, wherein the third coupler has two outputs, to enable the multistage equalizer to function as multiplexer or demultiplexer.

7. A method of equalizing one or more received signals modulated at a preselected modulation bit rate in an optical system, the method comprising the steps of:
    (a). splitting the received signal light into a first group of signals including two or more variable portions;
    (b). creating a differential delay between the two or more of the variable portions of the first group of signals, which is approximately is equal to an integer multiple of 1/Δf, where Δf is the channel spacing between adjacent wavelengths utilized in the optical system;

(c). Adjusting the phase of the light in one of the two or more variable portions of the first group of signals;

(d). generating a second group of signals including two or more variable portions that are each a combination of the two or more variable portions of the first group of signals generated in the phase adjusting step (c);

(e). creating a differential delay between the two or more of the variable portions of the second group of signals, which is approximately is equal to an integer multiple of 1/Δf, where Δf is the channel spacing between adjacent wavelengths utilized in the optical system;

(f). adjusting the phase of the light in one of the two or more variable portions of the second group of signals; and (g). combining the resulting two or more variable portions of the second group of signals from the phase adjusting step (f).

* * * * *